United States Patent
Ryder

[11] Patent Number: 5,806,468
[45] Date of Patent: Sep. 15, 1998

[54] LEASH ASSEMBLY

[76] Inventor: Israel Sidney Ryder, 3111 Bayou Gerimond Rd., Port Barre, La. 70577

[21] Appl. No.: 944,074

[22] Filed: Oct. 4, 1997

[51] Int. Cl.[6] .................................................. A01K 27/00
[52] U.S. Cl. ............................................................ 119/776
[58] Field of Search .................................... 119/776, 772, 119/769, 778, 774, 798

[56] References Cited

U.S. PATENT DOCUMENTS

| 296,764 | 4/1884 | Marquardt . | |
|---|---|---|---|
| 1,059,084 | 4/1913 | Starkey . | |
| 2,356,715 | 8/1944 | Webster | 119/776 |
| 2,652,809 | 9/1953 | Foster | 119/776 |
| 2,821,169 | 1/1958 | Barhorst | 119/776 |
| 3,074,378 | 1/1963 | Clayton . | |
| 3,910,234 | 10/1975 | Henson | 119/774 |
| 4,404,927 | 9/1983 | Woutat | 119/776 |
| 4,903,638 | 2/1990 | Lacey | 119/776 |
| 5,146,876 | 9/1992 | McPhail | 119/798 |
| 5,197,410 | 3/1993 | Wilson et al. | 119/776 |
| 5,732,662 | 3/1998 | Jacobsen | 119/798 |

*Primary Examiner*—Michael J. Carone
*Assistant Examiner*—Yvonne R. Abbott
*Attorney, Agent, or Firm*—Joseph N. Breaux

[57] ABSTRACT

A leash assembly that can be used in connection with a quick release collar clip including a restrain strap attachment loop, a spring biased release slide, a release strap securing bolt, at least one stationary clip member, and a pivoting clip member. The leash assembly includes a handle assembly having a rigid handle grip, a restraint strap having a restraint strap handle end secured to a center position of the rigid handle grip, and a release strap having a release strap handle end secured to an end point of the rigid handle, the release strap being of a length longer than the restraint strap such that when the restraint strap is under tension from a clip securing end of the restraint strap, the rigid handle member is positionable such that a release slide securing end of the release strap is moved closer toward the clip securing end of the restraint strap.

16 Claims, 2 Drawing Sheets

LEASH ASSEMBLY

TECHNICAL FIELD

The present invention relates to animal restraints and more particularly to a leash assembly for use with a quick release collar clip including a restrain strap attachment loop, a spring biased release slide, a release strap securing bolt, at least one stationary clip member, and a pivoting clip member; the leash assembly including a handle assembly having a rigid handle grip, a restraint strap having a restraint strap handle end secured to a center position of the rigid handle grip, and a release strap having a release strap handle end secured to an end point of the rigid handle, the release strap being of a length longer than the restraint strap such that when the restraint strap is under tension from a clip securing end of the restraint strap, the rigid handle member is positionable such that a release slide securing end of the release strap is moved closer toward the clip securing end of the restraint strap.

BACKGROUND ART

It is often desirable for police officers and other security force members to use a dog when patrolling, subduing a suspect or performing other security related tasks. Although the security force member typically controls the dog with a short leash, it is often necessary for the security member to rapidly release the dog such as for instance to subdue a fleeing suspect. It would be a benefit, therefore, to have a leash assembly that could be used in connection with a quick release collar clip for allowing a user to rapidly release a dog tethered by the leash assembly. Because the security force member must often enter a dangerous area before making the determination to release the dog, it would be a benefit to have a leash assembly that could be used in connection with a quick release collar clip that allowed a user to restrain and then rapidly release a dog tethered by the leash assembly using only a single hand so as to free the remaining hand for holding a flashlight or weapon. It would of course be a benefit to have such a leash assembly that could release the dog tethered by the leash assembly by a user while holding the handle of the leash assembly in a normal handle holding grip.

GENERAL SUMMARY DISCUSSION OF INVENTION

It is thus an object of the invention to provide a leash assembly.

It is a further object of the invention to provide a leash assembly that can be used in connection with a quick release collar clip to allow a user to rapidly release a dog tethered by the leash assembly.

It is a still further object of the invention to provide a leash assembly that can be used in connection with a quick release collar clip and that allows a user to restrain and then rapidly release a dog tethered by the leash assembly using only a single hand.

It is a still further object of the invention to provide a leash assembly that can be used in connection with a quick release collar clip and that allows a user to release the dog tethered by the leash assembly while holding the handle of the leash assembly in a normal handle holding grip.

It is a still further object of the invention to provide a leash assembly that can be used in connection with a quick release collar clip including a restrain strap attachment loop, a spring biased release slide, a release strap securing bolt, at least one stationary clip member, and a pivoting clip member; the leash assembly including a handle assembly having a rigid handle grip, a restraint strap having a restraint strap handle end secured to a center position of the rigid handle grip, and a release strap having a release strap handle end secured to an end point of the rigid handle, the release strap being of a length longer than the restraint strap such that when the restraint strap is under tension from a clip securing end of the restraint strap, the rigid handle member is positionable such that a release slide securing end of the release strap is moved closer toward the clip securing end of the restraint strap.

It is a still further object of the invention to provide a leash assembly that can be used in connection with a quick release collar clip that accomplishes some or all of the above objects in combination.

Accordingly, a leash assembly for use in connection with a quick release collar clip including a restrain strap attachment loop, a spring biased release slide, a release strap securing bolt, at least one stationary clip member, and a pivoting clip member is provided. The leash assembly includes a handle assembly having a rigid handle grip, a restraint strap having a restraint strap handle end secured to a center position of the rigid handle grip, and a release strap having a release strap handle end secured to an end point of the rigid handle, the release strap being of a length longer than the restraint strap such that when the restraint strap is under tension from a clip securing end of the restraint strap, the rigid handle member is positionable such that a release slide securing end of the release strap is moved closer toward the clip securing end of the restraint strap. The handle assembly preferably includes a rigid molded plastic handle grip having a number of finger depressions; a centrally positioned forward restraint strap securing mechanism including a locking pin and a pair of spaced strap attachment structures forming a strap insertion slot, each strap attachment structure having a locking pin aperture; and a release strap securing mechanism including a securing notch having a securing bolt aperture, a securing bolt and a securing nut. The release strap preferably includes a length adjustment mechanism such as a buckle or other common strap length adjustment mechanism. Use of a length adjustment mechanism on the release strap provides the user with a mechanism for adjusting the angle to which the rigid handle must be tilted to move the spring biased release slide of the quick release collar clip, which is attached to the release slide securing end of release strap prior to use, into the open release position. In use, the dog is restrained by tension from the shorter restraining strap between the rigid handle and the quick release collar clip, when the user wants to release the dog a quick twist or pivot of the rigid handle member causes a tensional force on the release strap between the top end of the rigid handle member and the release slide that causes the release slide to move into the open release position releasing the dog in a rapid movement requiring only one hand and no repositioning of the user's fingers.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
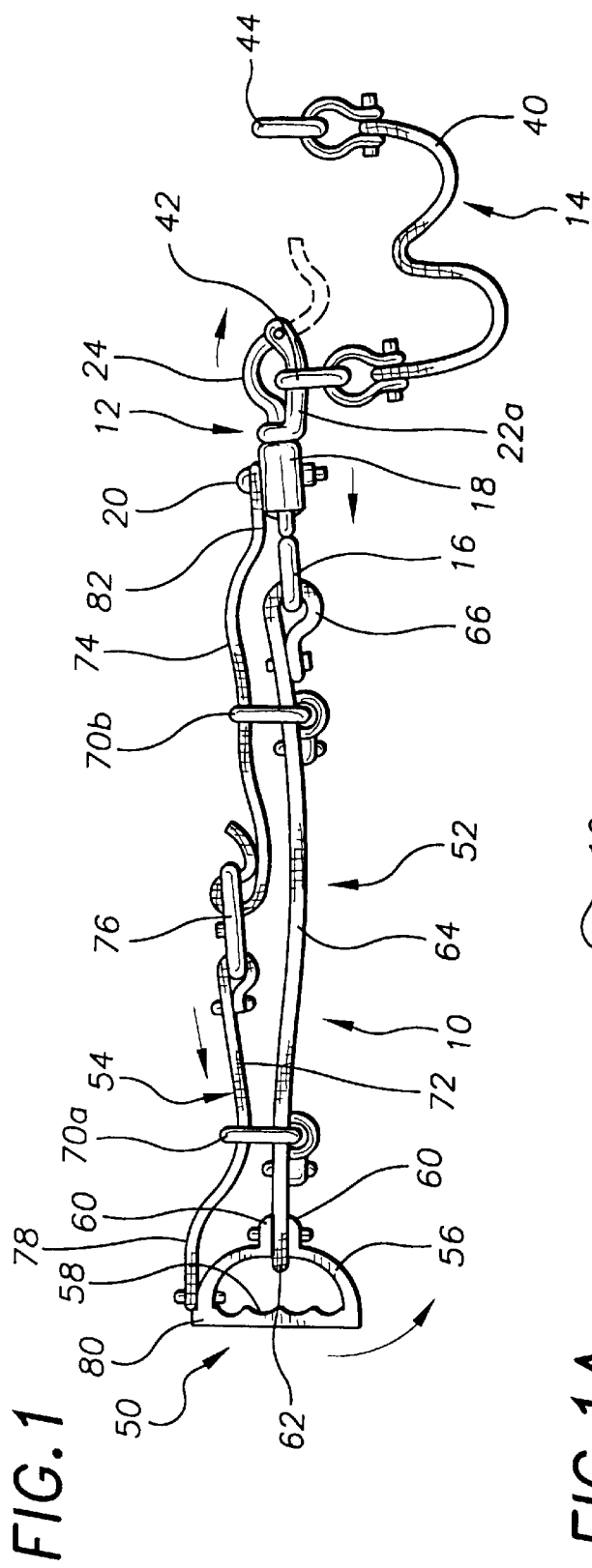
FIG. 1 is a side plan view of an exemplary embodiment of the leash assembly of the present invention; a representative quick release collar clip including a restraint strap attachment loop, a spring biased release slide, a release strap securing bolt, two stationary clip members, and a pivoting clip member; and a representative dog collar including a first collar securing loop secured over one of the stationary clip members and a second collar securing loop that is positionable over the pivoting clip member; the exemplary leash assembly including a first exemplary handle assembly including a first exemplary rigid handle grip, a restraint strap that is secured between a center point of the first exemplary rigid handle grip and the restraint strap attachment loop of the collar clip, and an adjustable length release strap secured between the release slide of the collar clip and an end point of the first exemplary handle grip of the handle assembly.
Figure 1A:
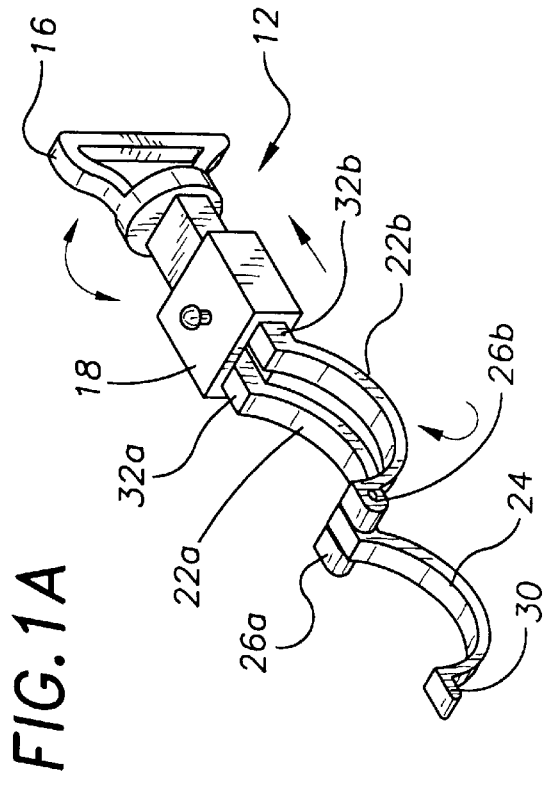
FIG. 1A is a perspective view of the quick release collar clip of FIG. 1 in isolation showing the restraint strap attachment loop, the two stationary clip members, the pivoting clip member pivotally connected between the far ends of the two stationary clip members and pivoted into the open position, and the spring biased release slide biased by the biasing spring into the forward clip member locking position.
Figure 1B:
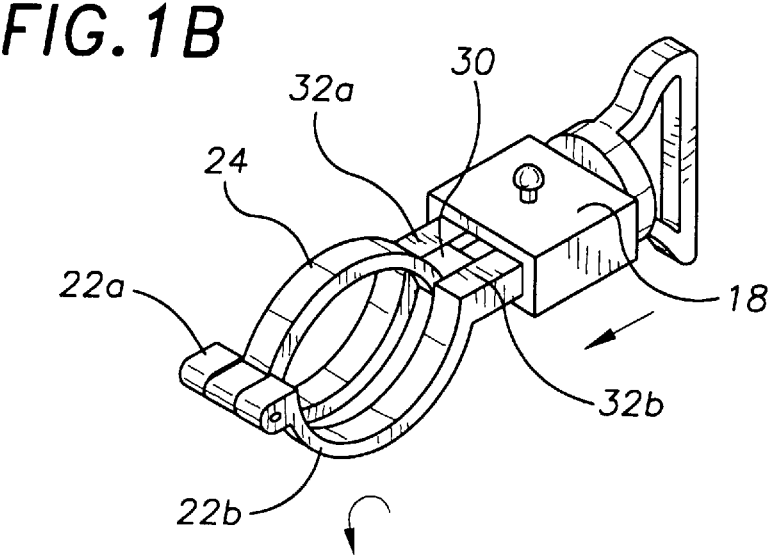
FIG. 1B is a second perspective view of the quick release collar clip of FIG. 1 in isolation showing the pivoting clip member pivoted into the closed position and the spring biased release slide forced back against the biasing spring into the rearward clip member release position.

FIG. 1 shows an exemplary embodiment of the leash assembly of the present invention, generally designated by the numeral 10; connected to a representative quick release collar clip, generally designated 12; and a representative dog collar, generally designated 14. Quick release collar clip 12 is of conventional cast metal construction and includes a restraint strap attachment loop 16, a spring biased release slide 18, a release strap securing bolt 20, two stationary clip members 22a,22b, (stationary clip member 22b shown in FIGS. 1A and 1B) and a pivoting clip member 24. With reference to FIG. 1A, pivoting clip member 24 is pivotally connected between the two far ends 26a,26b of stationary clip members 22a,22b. With respect to FIG. 1B, pivoting clip member 24 is pivotal into a closed position wherein a locking tab 30 is positioned between the two slide ends 32a,32b of stationary clip members 22a,22b. Once locking tab 30 is positioned between the two slide ends 32a,32b of stationary clip members 22a,22b, spring biased release slide 18 is released and, with reference again to FIG. 1A, returns to a forward locking position wherein locking tab 30 is locked in position between slide ends 32a,32b.

With reference back to FIG. 1, dog collar 14 includes a central leather collar strap 40 that has a first moveably mounted collar securing loop 42 at a first end thereof and a second moveably mounted collar securing loop 44 at a second end thereof. In this embodiment, first collar securing loop 42 is permanently installed over stationary clip member 22a. In use collar strap 14 is fitted about the neck of a dog and closed by positioning second collar securing loop over pivoting clip member 24 prior to locking pivoting clip member 24 in the closed position as previously described.

Leash assembly 10 includes a handle assembly, generally designated 50; a restraint strap assembly, generally designated 52; and a release strap assembly, generally designated 54. In this embodiment, handle assembly 50 includes a rigid handle grip 56 formed of steel reinforced leather that includes a gripping portion 58 that is attached by two equal length attachment sections 60 to a restraint strap handle end 62 of a nylon restraint strap 64. Nylon restraint strap 64 also includes a clip securing end 66 that is attached to restraint strap attachment loop 16 of quick release collar clip 12. Two guide rings 70a,70b are secured along nylon restraint strap 64.

Release strap assembly 54 includes a handle side release strap member 72 and a clip side release strap member 74 that are adjustably connectable with a conventional strap buckle 76. Handle side release strap member 72 has a release strap handle end 78 that is threaded through guide ring 70a and riveted to an end point 80 of rigid handle grip 56. Clip side release strap member 74 has a release slide securing end 82 that is threaded through guide ring 70b and secured to release slide 18 of quick release collar clip 12 using release strap securing bolt 20.

Figure 2:
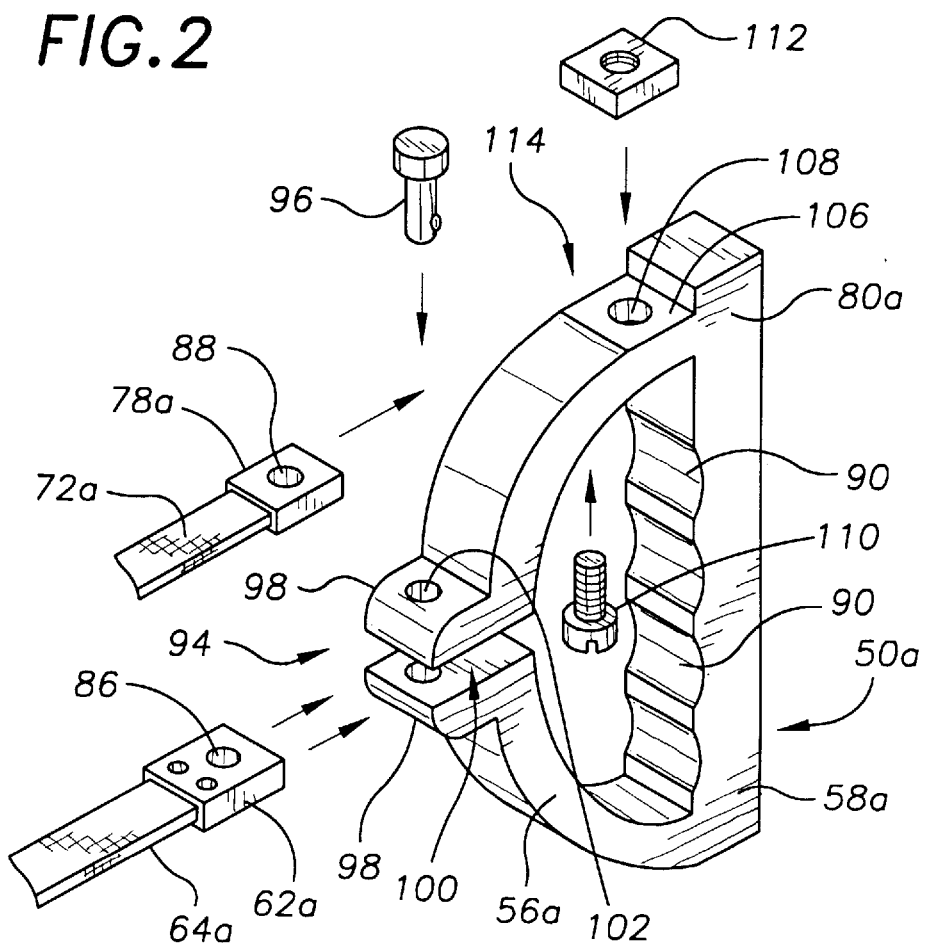
FIG. 2 is an exploded detail perspective view showing a restraint strap handle end, a release strap handle end, and a second exemplary rigid handle assembly; the second exemplary rigid handle assembly including a rigid molded plastic handle grip having a number of finger depressions; a centrally positioned forward restraint strap securing mechanism including a locking pin and a pair of spaced strap attachment structures forming a strap insertion slot, each strap attachment structure having a locking pin aperture; and a release strap securing mechanism including a securing notch having a securing bolt aperture, a securing bolt and a securing nut.

FIG. 2, a shows a detail perspective view of a second exemplary restraint strap handle end 62a of a nylon restraint strap 64a and a second exemplary release strap handle end 78a of a handle side release strap member 72a. Restraint strap handle end 62a has an attachment aperture 86 formed therethrough. Release strap handle end 78a has an attachment aperture 88 formed therethrough. FIG. 2 also shows a second exemplary handle assembly generally designated by the designation 50a. In this embodiment handle assembly 50a includes a rigid molded plastic handle grip 56a having a number of finger depressions 90 formed into a gripping portion 58a. Handle grip 56a has a centrally positioned forward restraint strap securing mechanism, generally designated 94 that includes a locking pin 96 and a pair of spaced strap attachment structures 98 that form a strap insertion slot 100 into which restraint strap handle end 62a is insertable. Each of the pair of spaced strap attachment structures 98 is provided with a locking pin aperture 102. During assembly, restraint strap handle end 62a is secured to rigid molded plastic handle grip 56a by positioning attachment aperture 86 in alignment with locking pin apertures 102 and then inserting locking pin 96 therethrough.

Rigid molded plastic handle grip 56a has a securing notch 106 formed into a top end 80a thereof that in conjunction with a securing bolt aperture 108, a securing bolt 110 and a securing nut 112 form a release strap securing mechanism, generally designated 114. Release strap securing mechanism 114 is used to secure release strap handle end 78a to rigid molded plastic handle grip 56a by aligning attachment aperture 88 of release strap handle end 78a with securing bolt aperture 108; inserting securing bolt 110 through attachment aperture 88 and securing bolt aperture 108; and then threading securing nut 112 onto securing bolt 110.

It can be seen from the preceding description that a leash assembly that can be used in connection with a quick release collar clip has been provided that can used to rapidly release a dog tethered by the leash assembly; that allows a user to restrain and then rapidly release a dog tethered by the leash assembly using only a single hand; that allows a user to release the dog tethered by the leash assembly while holding the handle of the leash assembly in a normal handle holding grip; and that is used in connection with a quick release collar clip including a restrain strap attachment loop, a spring biased release slide, a release strap securing bolt, at least one stationary clip member, and a pivoting clip member; the leash assembly including a handle assembly having a rigid handle grip, a restraint strap having a restraint strap handle end secured to a center position of the rigid handle grip, and a release strap having a release strap handle end secured to an end point of the rigid handle, the release strap being of a length longer than the restraint strap such that when the restraint strap is under tension from a clip securing end of the restraint strap, the rigid handle member is positionable such that a release slide securing end of the release strap is moved closer toward the clip securing end of the restraint strap.

It is noted that the embodiment of the leash assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A leash assembly for use in connection with a quick release collar clip including a restrain strap attachment loop, a spring biased release slide, at least one stationary clip member, and a pivoting clip member; said leash assembly comprising:

a handle assembly having a rigid handle grip;

a restraint strap having a restraint strap handle end secured to a center position of said rigid handle grip and a clip securing end attachable to the restraint strap attachment loop of the quick release collar clip; and a release strap assembly having a release strap handle end secured to an end point of said rigid handle and a release slide securing end that is securable to the release slide of the quick release collar clip;

said release strap being of a length longer than said restraint strap such that when said restraint strap is under tension from said clip securing end, said rigid handle member is positionable such that said release slide securing end of said release strap is moved closer toward said clip securing end of said restraint strap.

2. The leash assembly of claim 1, wherein:

said release strap assembly includes a length adjustment mechanism.

3. The leash assembly of claim 2, wherein:

said handle assembly includes a rigid molded plastic handle grip having a number of finger depressions.

4. The leash assembly of claim 3, wherein:

said handle assembly includes a release strap securing mechanism including a securing notch having a securing bolt aperture, a securing bolt and a securing nut.

5. The leash assembly of claim 4 wherein:

said handle assembly includes a centrally positioned forward restraint strap securing mechanism including a locking pin and a pair of spaced strap attachment structures forming a strap insertion slot, each of said pair of strap attachment structures having a locking pin aperture.

6. The leash assembly of claim 3 wherein:

said handle assembly includes a centrally positioned forward restraint strap securing mechanism including a locking pin and a pair of spaced strap attachment structures forming a strap insertion slot, each of said pair of strap attachment structures having a locking pin aperture.

7. The leash assembly of claim 2 wherein:

said handle assembly includes a release strap securing mechanism including a securing notch having a securing bolt aperture, a securing bolt and a securing nut.

8. The leash assembly of claim 7 wherein:

said handle assembly includes a centrally positioned forward restraint strap securing mechanism including a locking pin and a pair of spaced strap attachment structures forming a strap insertion slot, each of said pair of strap attachment structures having a locking pin aperture.

9. The leash assembly of claim 2 wherein:

said handle assembly includes a centrally positioned forward restraint strap securing mechanism including a locking pin and a pair of spaced strap attachment structures forming a strap insertion slot, each of said pair of strap attachment structures having a locking pin aperture.

10. The leash assembly of claim 1, wherein:

said handle assembly includes a rigid molded plastic handle grip having a number of finger depressions.

11. The leash assembly of claim 10 wherein:

said handle assembly includes a release strap securing mechanism including a securing notch having a securing bolt aperture, a securing bolt and a securing nut.

12. The leash assembly of claim 11 wherein:

said handle assembly includes a centrally positioned forward restraint strap securing mechanism including a locking pin and a pair of spaced strap attachment structures forming a strap insertion slot, each of said pair of strap attachment structures having a locking pin aperture.

13. The leash assembly of claim 10 wherein:

said handle assembly includes a centrally positioned forward restraint strap securing mechanism including a locking pin and a pair of spaced strap attachment structures forming a strap insertion slot, each of said pair of strap attachment structures having a locking pin aperture.

14. The leash assembly of claim 1 wherein:

said handle assembly includes a release strap securing mechanism including a securing notch having a securing bolt aperture, a securing bolt and a securing nut.

15. The leash assembly of claim 14 wherein:

said handle assembly includes a centrally positioned forward restraint strap securing mechanism including a locking pin and a pair of spaced strap attachment structures forming a strap insertion slot, each of said pair of strap attachment structures having a locking pin aperture.

16. The leash assembly of claim 1 wherein:

said handle assembly includes a centrally positioned forward restraint strap securing mechanism including a locking pin and a pair of spaced strap attachment structures forming a strap insertion slot, each of said pair of strap attachment structures having a locking pin aperture.

* * * * *